(12) United States Patent
Li

(10) Patent No.: US 7,611,464 B2
(45) Date of Patent: Nov. 3, 2009

(54) METHOD FOR PROCESSING DOPPLER SIGNAL GAPS

(75) Inventor: Yong Li, Nanshan (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 451 days.

(21) Appl. No.: 11/323,839

(22) Filed: Dec. 30, 2005

(65) Prior Publication Data

US 2007/0049823 A1    Mar. 1, 2007

(30) Foreign Application Priority Data

Aug. 16, 2005    (CN) ................... 2005 1 0036711

(51) Int. Cl.
  *A61B 8/00*    (2006.01)
  *H03F 1/26*    (2006.01)
  *H04B 15/00*    (2006.01)
(52) U.S. Cl. ................ 600/441; 600/454; 600/453; 702/189
(58) Field of Classification Search .......... 600/454, 600/441
  See application file for complete search history.

(56) References Cited

U.S. PATENT DOCUMENTS

| 4,559,952 A | 12/1985 | Angelsen et al. | |
| 5,457,717 A | 10/1995 | Bellamy | |
| 5,476,097 A | 12/1995 | Robinson | |
| 5,642,732 A | 7/1997 | Wang | |
| 5,913,824 A * | 6/1999 | Ogasawara et al. | 600/455 |
| 6,039,692 A * | 3/2000 | Kristoffersen | 600/454 |

FOREIGN PATENT DOCUMENTS

| CN | 85103558 A | 11/1986 |
| CN | 1644170 A | 7/2005 |

OTHER PUBLICATIONS

Bjaerum, S., Torp, H. and Kristoffersen, K. "Clutter Filter Design for Ultrasound Color Flow Imaging." IEEE Transactions on Ultrasound, Ferroelectrics, and Frequency Control, vol. 49, No. 2, Feb. 2002, pp. 204-216.*
Chornoboy, E.S. "Initialization for Improved IIR Filter Performance." IEEE Transactions on Signal Processing. vol. 40, No. 3, Mar. 1992, pp. 543-550.*

* cited by examiner

*Primary Examiner*—Long V Le
*Assistant Examiner*—Angela M Hoffa
(74) *Attorney, Agent, or Firm*—Kory D. Christensen; Stoel Rives LLP

(57) ABSTRACT

A method for processing Doppler signal gaps may include receiving Doppler signals during Doppler signal acquisition to obtain data of in-phase (I) component and quadrate (Q) component signals of the Doppler signals. The method may also include receiving interruption of the Doppler signals and estimating the data of the Doppler signals interrupted in the gap period filling the interrupted Doppler signals with the data of the estimated Doppler signals so that the data of the I and Q component signals in the gap period are filled to form a continuous output. The method may further include generating Doppler spectrum data or Doppler sound based on the data of the filled I and Q component signals.

15 Claims, 3 Drawing Sheets

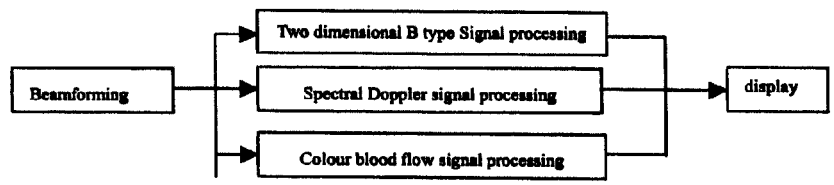
Fig. 1    (Prior Art)
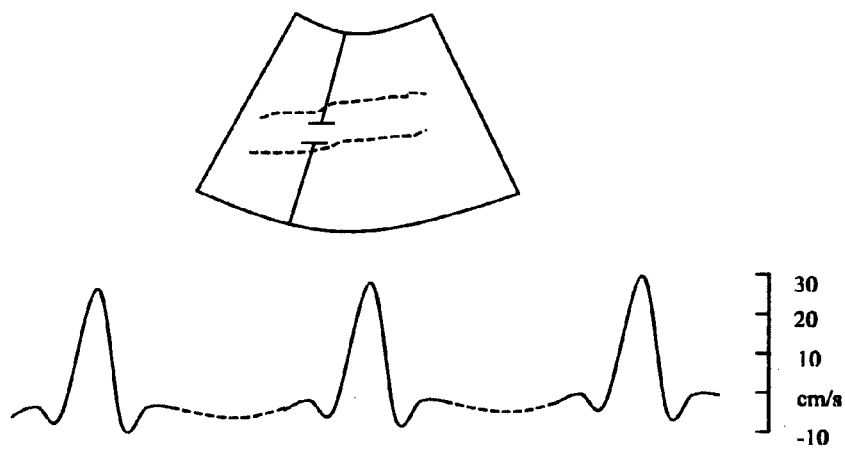
Fig. 2    (Prior Art)
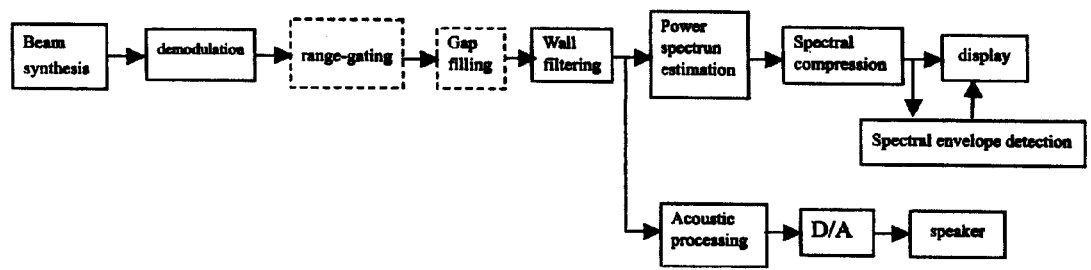
Fig. 3    (Prior Art)

METHOD FOR PROCESSING DOPPLER SIGNAL GAPS

FIELD OF THE INVENTION

The present invention relates to ultrasonic techniques, and in particular to data processing in a multimode ultrasonic scanning system and a method for processing Doppler signal data.

BACKGROUND OF THE INVENTION

Modern medical ultrasonic diagnostic systems usually can combine detecting contents and display them simultaneously, for example, synchronously displaying two-dimensional B mode image and Doppler spectrum diagram, or synchronously displaying Doppler spectrum diagram and colour blood flow image, by which a doctor diagnoses diseases.

FIG. 1 shows a typical medical ultrasonic imaging system for measuring Doppler blood flow velocity. The system comprises a multi-element ultrasonic transducer array (not shown), which is capable of converting high voltage electrical pulses into ultrasonic waves in transmitting stages and converting ultrasonic echoes into electric signals in receiving stages. The echo signals received by each of the array units of the transducer are sent to a beamformer module, and are processed to improve the signal-to-noise ratio of the echo signals. Then, according to the characteristics of the echoes, the system sends output signals of said beamformer to respective signal processing modules, wherein those related to the B mode images are sent to a two-dimensional B mode signal processing module for obtaining two-dimensional B mode image data; those related to spectral Doppler information are sent to the spectral Doppler signal processing module for obtaining Doppler spectral data; and those related to colour blood flow are sent to the colour blood flow signal processing module for obtaining colour blood flow data. Finally, a display module combines said two-dimensional B mode image data, Doppler spectral data and colour blood flow data to form resultant data for synchronously displaying on the display screen.

FIG. 3 shows a flowchart of processing Doppler spectral signals, for example, in an ultrasonic Doppler blood flow analysis system. After the beamforming of the ultrasonic echo, an RF echo is formed, which is decomposed into two component signals by a demodulation module, i.e., an in-phase component I signal and a quadrate component Q signal. Then, in a continuous wave Doppler system, the I and Q components are directly in a wall filtering processing stage. In a pulsed wave Doppler system, the I and Q components are gated in range first, respectively, that is, accumulated in a specific time interval. The accumulation time interval and the length of the pulsed Doppler transmitted pulse are selected by an operator according to actual situations, then the I and Q components are in the wall filtering processing stage. The wall filter is a high pass filter, and can filter clutters caused by stable or slow moving tissues. The I and Q components after the processing of this stage, which mainly comprise the echoes caused by the motion of red blood cells, are sent to a power spectrum estimation module, which estimates a power spectrum usually by the use of fast Fourier transform (FFT). The number of points of the FFT may be 128 or 256. Since the dynamic range of the estimated power spectrum is too wide, it is necessary for the estimated power spectrum to be compressed into a gray scale display range. The Doppler spectrum diagram finally displayed on the screen represents the power spectral intensity at a certain time and at a certain velocity, i.e. at a certain frequency shift. The system may further comprise an automatic envelope detection module for analyzing the compressed data, automatically tracking the variations of the peak velocity and mean velocity of the blood flow with time, and displaying them on the Doppler spectrum diagram in real time, Furthermore, the wall-filtered I and Q data may further be sent to an acoustic processing module to form acoustic data of the forward blood flow and the reverse blood flow, then these data are D/A converted and sent to a speaker, respectively, so as to generate sounds of forward and reverse blood flows.

FIG. 2 shows a two-dimensional B type image and a spectral Doppler diagram synchronously displayed by the system. The upper portion of the figure indicates the two-dimensional B type image in which the dotted lines show the positions and directions of blood vessels. The operator may select sampling lines corresponding to the blood flow to be detected and corresponding interested regions. The lower portion of the figure indicates the Doppler spectrum diagram of blood flow in the selected region.

In order to display synchronously the two-dimensional B mode image and spectral Doppler image on the screen, as shown in FIG. 2, the ultrasonic imaging system usually performs fast switching between the two-dimensional B mode scanning and Doppler scanning. Thus, the B mode image scanning and the Doppler blood flow measurement scanning are performed in different time intervals. The fast switching between two different scanning modes has the advantage that the interaction of the imaging results is very small. Because the scanning of the two systems are performed in different time intervals, the two systems can share a single scanhead, and the Doppler transmitting mode may be a pulsed or a continuous mode. However, there is also an inherent drawback in this approach, that is, the Doppler signal may be missed due to interruption of the Doppler scanning while performing B type image scanning. The update of two-dimensional B type image and Doppler diagram implemented in this manner must result in discontinuity in the Doppler spectral diagram and Doppler sound. The discontinuous time interval of the Doppler signal caused by the switching to other working modes is called a gap.

Referring to FIG. 2, the solid lines correspond to the spectrum diagram in non-gap time intervals, and the dotted lines correspond to the spectrum diagram in gap time intervals. There is no Doppler signal in the gap time intervals; and the Doppler spectrum diagram is interrupted, that is, there is no Doppler spectrum in the time intervals of the dotted lines. In the gap time intervals, the Doppler sound is also interrupted due to lack of Doppler signals. Therefore, in a multimode ultrasonic scanning synchronous display system, a gap filling method is usually used to compensate visual or audio discontinuity of the Doppler spectrum diagram or Doppler sound caused by the gaps. As illustrated by the dotted line blocks and the flowchart in FIG. 3, the function of the gap filling module is to estimate the lost Doppler signals and to make the Doppler signals continuous, thereby the continuity of the Doppler spectrum diagram and the Doppler sound can be maintained.

In the technical solution disclosed in U.S. Pat. No. 5,476,097, Robinson proposed a method of filling the gaps of the results of the Doppler spectrum diagram and the Doppler sound after Doppler processing, so as to make them more continuous on visual or audio effect. The gaps in the Doppler spectrum diagram are filled by the use of a spanning method; each of the calculated spectra near the gaps is repeated for two times; and the gaps of the Doppler sound are filled by the use of directly repeating the Doppler sound results in the non-gap intervals.

In the technical solution disclosed in U.S. Pat. No. 4,559,952, Angelsen proposed a method of directly filling I and Q Doppler signals. According to that method, the I and signals are continuous in the succeeding Doppler processing.

The above-mentioned prior art references have some disadvantages. The effect of sound filling of the filling method of U.S. Pat. No. 5,476,097 is relatively ideal, no interrupt can be felt audibly. However, the visual effect of the Doppler Spectrum diagram filling is not satisfactory. The effect will be better where the difference of Doppler spectrum diagrams before and after the gap is not great. However, when the difference of the spectrum diagrams before and after the gap is relatively great, a significant sudden change can be seen at the joints of spanning due to the use of the spanning method. The filling method of U.S. Pat. No. 4,559,952 only employs the I and Q Doppler signals for filling. The gap interval may not be too long in order to result in a good filling effect. However, a too short gap interval may restrict the imaging quality of scanning of other modes.

SUMMARY OF THE INVENTION

The object of the present invention is to overcome the disadvantages of the above mentioned prior arts and to provide a gap processing method capable of preferably filling the gaps of the Doppler spectrum diagram or the Doppler sound, and providing visual or audio continuity, without impairing the imaging quality of other scanning modes of the ultrasonic scanning system.

In order to achieve the above-mentioned object, the present invention provides a method for processing Doppler signal gaps, comprising the steps of:

receiving Doppler signals during Doppler signal acquisition to obtain data of in-phase (I) component and quadrate (Q) component signals of the Doppler signals; receiving interruption of the Doppler signals indicating that the output of the data of said I and Q component signals is interrupted in a gap period; estimating the data of the Doppler signals interrupted in said gap period based on the Doppler signals received during Doppler signal acquisition filling the interrupted Doppler signals with the data of the estimated Doppler signals so that the data of the I and Q component signals in said gap period are filled to form a continuous output; and generating Doppler spectrum data or Doppler sound based on the data of the filled I and Q component signals.

In the filling step, the whole gap may be divided into at least two time intervals; and the data of the interrupted Doppler signal in different time intervals may be filled with the data of Doppler signals before and after the gap, respectively.

In the filling step, a predetermined filling data may be repeatedly output in a predetermined gap time interval to be filled.

The time interval to which the predetermined filling data belongs may be shorter than the time interval to be filled, so that said predetermined filling data are repeatedly output more than once in said time interval to be filled.

The filling step may further comprise weighting the data of the Doppler signals so as to smooth the Doppler data in beginning, intermediate and end time intervals of said gap, caused by the repetition of the predetermined filling data.

The weighting step may comprise processing the data of the Doppler signals by a window function.

The method according to the present invention may further comprise: filtering the received Doppler signals by an initialized high pass filter to reduce the transient response time of said high pass filter, so as to shorten the gap period. The high pass filter may include a second-order IIR filter.

The present invention provides an ultrasonic scanning synchronous display system, comprising:

means for receiving Doppler signals during Doppler signal acquisition to obtain data of in-phase (I) component and quadrate (Q) component signals of the Doppler signals; means for receiving interruption of the Doppler signals, in which the output of the data of said I and Q component signals is interrupted and in a gap period; means for estimating the data of the Doppler signals interrupted in said gap period based on the Doppler signals received during Doppler signal acquisition means for filling the interrupted Doppler signals with the data of the estimated Doppler signals so that the data of the I and Q component signals in said gap period are filled to form a continuous output; and means for generating Doppler spectrum data or Doppler sound based on the data of the filled I and Q component signals.

By the use of the above-mentioned method and system, more smoothly continuous the Doppler signals can be provided; and further processing performed on the filled continuous Doppler signals can provide more continuous Doppler spectrum image and Doppler sound, so that the multimode ultrasonic scanning system can realize synchronous display in low cost, even the image quality of other non-Doppler imaging can be improved.

BRIEF DESCRIPTION OF THE DRAWINGS

FIG. 1 shows the flowchart of signal processing in an ultrasonic imaging system;

FIG. 2 shows the synchronous display of a two-dimensional B type image and a spectral Doppler diagram;

FIG. 3 shows the flowchart of Doppler signal processing;

DETAILED DESCRIPTION OF THE INVENTION

In an embodiment of the present invention, a method for processing Doppler signal gaps is used in the Doppler spectral signal processing procedure when the Doppler scanning is rapidly switched in an ultrasonic scanning synchronous display system, the method comprises following steps:

A. when the system operates in the Doppler scanning mode, data of the I and Q component signals of the Doppler signal are obtained after the demodulation, filtering, and A/D conversion of RF ultrasonic echoes, which are provided to the system for performing power spectral processing to generate the Doppler spectrum image data, or for performing acoustic processing to generate Doppler sound;

B. the reception of the Doppler signals is interrupted when the system operates in non-Doppler scanning mode or in the initial stage of reentering the Doppler scanning mode; the output of the data of said I and Q component signals is interrupted and is in a gap period;

C. the Doppler signals interrupted in said gap period are estimated and filled by the system based on the Doppler signals in the non-gap period, so that the I and Q component signals data in said gap period are filled to form a continuous output; and D. the system generates the Doppler Spectrogram data or Doppler sound based on the I and Q component signals data continuously outputted after the filling processing.

In particular, in said step C, the whole gap is divided into at least two time intervals by the system, and the data of interrupted Doppler signal in different time intervals are filled with the data of Doppler signal before or after the gap, respectively.

In another embodiment of the present invention, when reenterring the Doppler scanning mode, the system reduces the transient response time of an high pass filter by initializing the high pass filter, thereby part of the gap period corresponding to the initial stage of said Doppler scanning in said step B is shortened.

Figure 4:
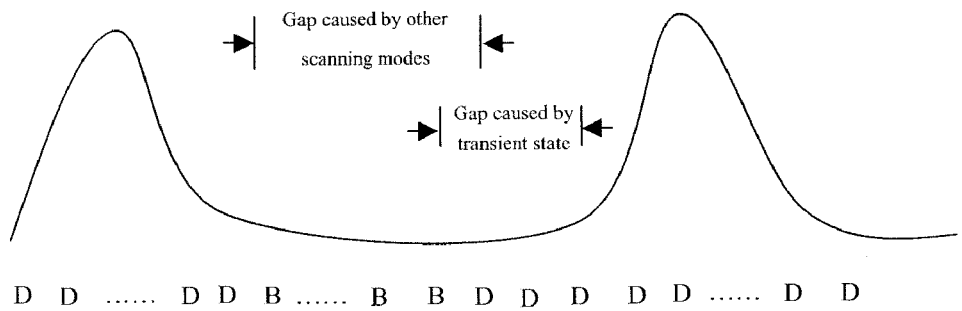
FIG. 4 shows the generation and analysis of a gap.

FIG. 4 shows the generation of gaps and takes the synchronously displaying of two-dimensional B type images and spectral Doppler images for example. In the figure, the curve represents a Doppler spectrum diagram, D represents the transmitting pulse that correlates to the Doppler spectrum, and B represents the transmitting pulse that correlates to a two-dimensional B type image. As mentioned in the foregoing, the B type image scanning and Doppler blood flow velocity measurement scanning are performed in different time intervals. The B type scanning and the Doppler scanning are switched from one to another rapidly. During the B type scanning, the gaps caused by the missing of Doppler signal due to the stop of scanning are referred to as "gaps caused by switching to other scanning modes." When the transmitting pulse switches from B to D (as shown in the flowchart of FIG. 3), because the wall filter is a high pass filter (a transient state exists), when the Doppler signal is wall filtered, the transient state of the wall filter may cause the Doppler signals of the initially transmitted pulses D to be invalid and unable to be used, thereby resulting in occurrence of the gaps, which are referred to as "gaps caused by transient state." Therefore, according to the present invention, the above mentioned technical problem may be resolved by the use of two different schemes with respect to different originations of gaps. The first scheme is that the missing I and Q Doppler data during a gap are estimated simultaneously based on the Doppler data before and after the gap, and the Doppler signals during the gap are filled therewith. That is, the whole gap is divided into two time intervals, such that the gap Doppler data in the first time interval are the repetition of the Doppler data before the gap, while the gap Doppler data in the second time interval are the repetition of the Doppler data after the gap. Thus it is possible to make the Doppler signal more continuous. The second scheme is that a method of initializing the filter is used to estimate the Doppler signal prior to high pass filtering based on the Doppler signal after the gap, so that the transient effect of the high pass filtering can be reduced. Thus the gap caused by the transient state can be reduced to make the Doppler signal more continuous, and particularly, a longer scanning time is permitted for another scanning mode to take. Thus, the continuity of the Doppler spectrum diagram or Doppler sound can be maintained visually or audibly when a rapid switching between the Doppler scanning and scanning of other modes occurs.

Figure 6:
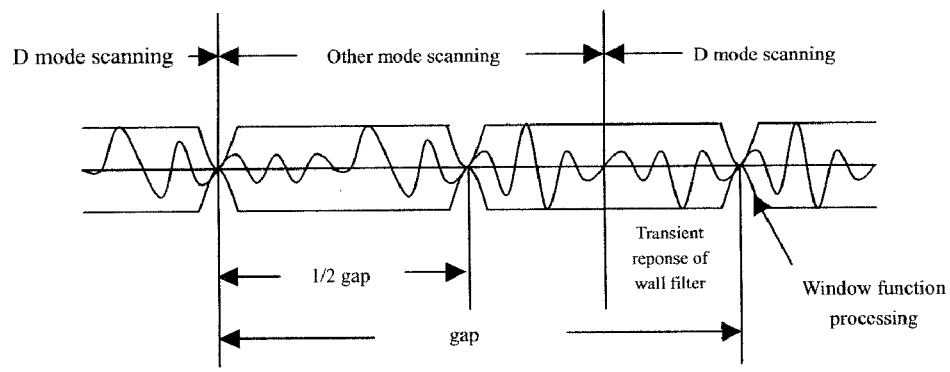
FIG. 6 shows the gap filling according to the method of the present invention.

FIG. 6 shows an embodiment of the gap processing method according to the present invention. In the filling step, the whole gap is divided by the system into at least two time intervals, and the data of Doppler signal interrupted in different time intervals are filled with the data of Doppler signals before and after the gap, respectively. FIG. 6 illustrates an example of processing the I or Q Doppler data. The whole gap time interval comprises gaps caused by other scanning modes and the gap caused by wall filtering, and may be divided into two time intervals (including but not limited to the evenly divided time intervals shown in FIG. 6). The Doppler data in the first time interval can be estimated by the use of the Doppler data before the gap, while the Doppler data in the second gap time interval can be estimated by the use of the Doppler data after the gap. Various methods can be used as a filling algorithm, wherein a simple one is the data repetition method, that is, predetermined filling data are repeatedly outputted in the predetermined filling gap time interval. For example, the Doppler data in the former gap are the repetition of the Doppler data before the gap, while the Doppler data in the latter gap are the repetition of the Doppler data after the gap. In addition, the predetermined filling data may be repeatedly outputted more than once in said time interval to be filled. Thus, non-smooth and non-continuation may occur in the Doppler data during the beginning, intermediate and end time intervals of the gap. By the use of a weighting method, the system may smoothen and continue where the non-smooth and non-continuation occurs, for example, by gradually converging the Doppler data before the discontinuous point to zero and gradually increasing the Doppler data after the discontinuous point from zero. Thereby, the continuity of the Doppler data can be maintained. Taking the end of the gap in FIG. 6 as an example, the Doppler data before and after this point are weighted by the use of a window function, respectively, so that continuity thereat of the Doppler data can be maintained.

Figure 5:
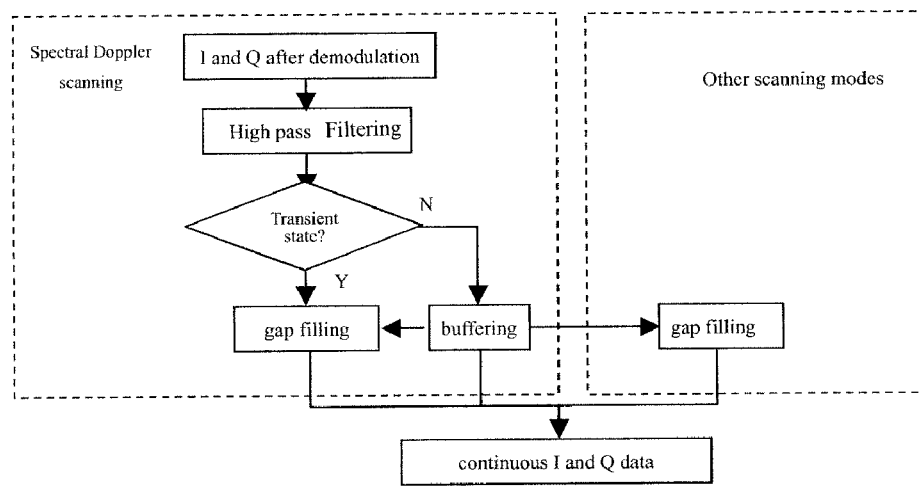
FIG. 5 shows the flowchart of the gap filling method of the present invention.

The second embodiment of the gap processing method according to the present invention is shown in FIG. 5. When the transmitting mode is the Doppler scanning mode, the demodulated I and Q Doppler data inputted into the gap filling module are effective. These two data are processed by high pass filtering. The high pass filter has the same filtering characteristics as that of the wall filter, and can filter off the clutters caused by the static or slowly moving tissues, thereby the gap filling data represent effective signals. When the high pass filter has the same characteristics as that of said wall filter (which may further replace the succeeding wall filtering processing in FIG. 3), the transient response gap shown in FIG. 4 may be caused each time the scanning mode is switched from the other scanning mode to the Doppler scanning mode. If the high pass filter is in a non-transient stage, then the two filtered Doppler data are sent to buffers, respectively, to be stored, and are outputted at the same time as effective data, which is a part of the continuous data after the gap filling processing. If the high pass filter is in the transient stage, then said two Doppler data are ineffective, and the I and Q data previously stored in the buffers are necessary to be used for gap filling to obtain continuous I and Q Doppler data. When the transmitting mode is one of the other non-Doppler modes, then the I and Q Doppler data stored in the buffers are used to estimate the missing I and Q signals in the gap.

The transient response time is generally relevant to a specific filter. When the high pass filter has a structure of an IIR filter, the transient response time may be as long as ten times of the number of orders of the IIR filter. In order to reduce the length of the gap, when the system according to the present embodiment reenters the Doppler scanning mode, a method of initializing the filter can be employed by the system to reduce the transient response time, and thereby the gap time caused by the transient response during initial stage of the Doppler scanning can be shortened. Thus the time of non-Doppler scanning can be increased, and the quality of the images of other non-Doppler imaging can be improved.

In this embodiment, the filling data used to fill the gaps in the transient stage and non-Doppler scanning modes, may be the data stored in the buffers before the end of the Doppler scanning mode, or in combination with the embodiment as shown in FIG. 6, the gap is divided into two time intervals and filled with the data buffered before the end of the Doppler scanning mode and the data buffered in the non-transient state at the beginning of next Doppler scanning mode, respectively. Substantially, the I and Q Doppler data after the gap filling of the present embodiment are continuously sent to subsequent modules for processing, including power spectrum estimation and acoustic processing, which are not described again.

The initialization of the filter means the estimation of the Doppler data before the signal by the use of the data of Doppler signal. Assuming that a second order filter is designed, the input is x(n), and the output is y(n), then the filter can be expressed by:

$$y(n)=b_0 x(n)+b_1 x(n-1)+b_2 x(n-2)-a_1 y(n-1)-a_2 y(n-2)$$

where $b_0$, $b_1$, $b_2$, $a_0$ and $a_1$ are coefficients of the second order IIR filter, then the corresponding Z transformation function can be defined as:

$$H(z) = \frac{Y(z)}{X(z)} = \frac{b_0 + b_1 z^{-1} + b_2 z^{-2}}{1 + a_0 z^{-1} + a_1 z^{-2}}$$

where X(z) is the Z transformation of input x(n), and Y(z) is the Z transformation of input y(n).

Figure 7:
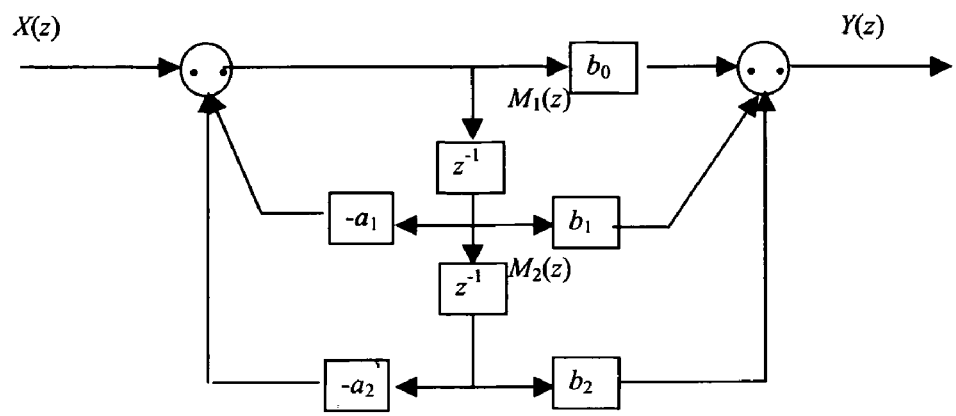
FIG. 7 shows a state-transition diagram of a second order IIR filter.

FIG. 7 gives the state transition diagram of the second order filter. A vector is defined as:

$$M(n) = \begin{bmatrix} m_1(n) \\ m_2(n) \end{bmatrix},$$

The state transition equation thereof can be expressed by:

$$M(n)=BM(n-1)+Cx(n)$$

$$y(n)=A^T M(n-1)+b_0 x(n)$$

Where $$A = \begin{bmatrix} b_1 - b_0 a_1 \\ b_2 - b_0 a_2 \end{bmatrix}$$

$$B = \begin{bmatrix} -a_1 & -a_2 \\ 1 & 0 \end{bmatrix}$$

$$C = \begin{bmatrix} 1 \\ 0 \end{bmatrix}$$

The state variable M may be expressed by $$M(n) = B^n M_{-1} + \sum_{k=1}^{n} B^{n-k} Cx(k)$$

The value of M(−1) determines the initial state of the filter, and affects the transient response time of the system. If the filter is not initialized, the default value is zero and the transient response will be relatively long. According to the present invention, M(−1) is initialized by the use of the input of N points; assuming the input of N points be X, and the output be Y, $$X=[x(0)x(1)\ldots x(N-1)]^T$$

$$y=[y(0)y(1)\ldots y(N-1)]^T$$

then $$Y=FM(-1)+GX$$

where the dimension of the vector F is N×2, the dimension of G is N N.

$$F = \begin{bmatrix} A^T \\ A^T B \\ \vdots \\ A^T B^{N-1} \end{bmatrix}$$

$$G = \begin{bmatrix} b_0 & 0 & \ldots & 0 & 0 & 0 & 0 \\ A^T C & b_0 & \ldots & 0 & 0 & 0 & 0 \\ A^T BC & A^T C & \ldots & 0 & 0 & 0 & 0 \\ \vdots & \vdots & \ldots & b_0 & 0 & 0 & 0 \\ \vdots & \vdots & \ldots & A^T C & b_0 & 0 & 0 \\ \vdots & \vdots & \ldots & A^T BC & A^T C & b_0 & 0 \\ A^T B^{N-2} C & A^T B^{N-3} C & \ldots & A^T B^2 C & A^T BC & A^T C & b_0 \end{bmatrix}$$

The optimal estimation of M(−1) can be obtained by the use of the method of least mean square error.

$$\hat{M}(-1)=-(F^T F)^{-1} F^T GX$$

Thus the filter can be initialized and the transient response can be reduced, and thereby the gap caused by the transient response can be reduced.

Figure 8:
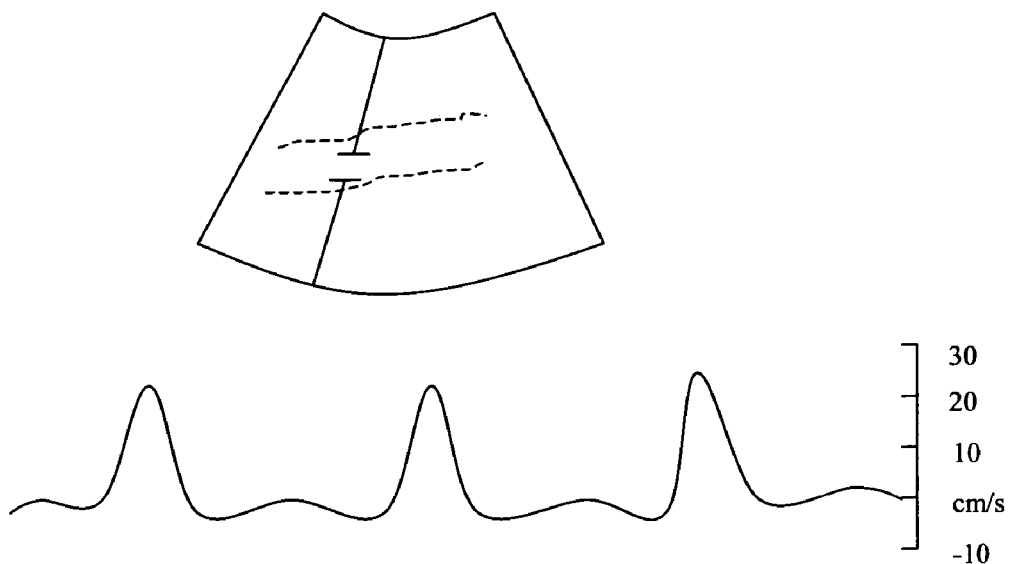
FIG. 8 shows the synchronous display of the two-dimensional B type image and spectral Doppler image after gap filling.

The gap filling method according to the present invention has been verified by experiments. By using the method, taking synchronous display of two-dimensional B type image and Doppler spectrum diagram for example, the synchronously displayed image as shown in FIG. 8 can be obtained, which results in very good effect of continuity of the Doppler spectrum diagram and Doppler sound.

What is claimed is:

1. A method for processing Doppler signal gaps, the method comprising the steps of:
   receiving Doppler signals during Doppler signal acquisition to obtain data of in-phase (I) component and quadrate (Q) component signals of the Doppler signals;
   receiving interruption of the Doppler signals indicating that the output of the data of said I and Q component signals is interrupted in a gap period, wherein the output of the data of said I and Q component signals is continuous both before and after the gap period;
   filtering the received Doppler signals using a high pass filter;
   estimating the data of the Doppler signals interrupted in said gap period based on the filtered Doppler signals received during Doppler signal acquisition;
   filling the interrupted Doppler signals with the data of the estimated Doppler signals so that the data of the I and Q component signals in said gap period are filled to form a continuous output;
   wall filtering the continuous output of the data of the filled I and Q component signals; and
   generating Doppler spectrum data or Doppler sound based on the wall filtered data of the filled I and Q component signals.

2. The method according to claim 1, wherein in the filling step, the whole gap is divided into at least two time intervals; and the data of the interrupted Doppler signal in different time intervals are filled with the data of Doppler signals before and after the gap, respectively.

3. The method according to claim 1, wherein in said filling step, a predetermined filling data is repeatedly output in a predetermined gap time interval to be filled.

4. The method according to claim 3, wherein the time interval to which the predetermined filling data belongs is shorter than the time interval to be filled.

5. The method according to claim 3, wherein said filling step further comprises weighting the data of the Doppler signals so as to smooth the Doppler data in beginning, intermediate and end time intervals of said gap, caused by the repeated output of the predetermined filling data.

6. The method according to claim 5, wherein said weighting step comprises processing the data of the Doppler signals by a window function.

7. The method according to claim 1, further comprising initializing said high pass filter to reduce the transient response time of said high pass filter, so as to shorten the gap period.

8. The method according to claim 7, wherein said high pass filter includes a second-order IIR filter.

9. An ultrasonic scanning synchronous display system, the system comprising:
  means for receiving Doppler signals during Doppler signal acquisition to obtain data of in-phase (I) component and quadrate (Q) component signals of the Doppler signals;
  means for receiving interruption of the Doppler signals, in which the output of the data of said I and Q component signals is interrupted and in a gap period, wherein the output of the data of said I and Q component signals is continuous both before and after the gap period;
  means for estimating the data of the Doppler signals interrupted in said gap period based on the Doppler signals received during Doppler signal acquisition, wherein said means for estimating includes a first filtering means for filtering the received Doppler signals;
  means for filling the interrupted Doppler signals with the filtered data of the estimated Doppler signals so that the data of the I and Q component signals in said gap period are filled to form a continuous output;
  second filtering means for filtering the continuous output of the data of the filled I and Q component signals; and
  means for generating Doppler spectrum data or Doppler sound based on the data of the filled I and Q component signals that has been filtered by the second filtering means.

10. The system according to claim 9, wherein the filling means divides the whole gap into at least two time intervals; and fills the data of the interrupted Doppler signal in different time intervals with the filtered data of Doppler signals before and after the gap, respectively.

11. The system according to claim 9, wherein said filling means repeatedly outputs a predetermined filling data in a predetermined gap time interval to be filled.

12. The system according to claim 11, wherein said filling means further comprises means for weighting the data of the Doppler signals so as to smooth the Doppler data in beginning, intermediate and end time intervals of said gap, caused by the repeated output of the predetermined filling data.

13. The system according to claim 12, wherein said weighting means comprises means for processing the data of the Doppler signals by a window function.

14. The system according to claim 9, wherein the first filtering means comprises an initialized high pass filter for filtering the received Doppler signals to reduce the transient response time of said high pass filter, so as to shorten the gap period.

15. The system according to claim 14, wherein said high pass filter includes a second-order IIR filter.

* * * * *

UNITED STATES PATENT AND TRADEMARK OFFICE
CERTIFICATE OF CORRECTION

PATENT NO. : 7,611,464 B2  Page 1 of 1
APPLICATION NO. : 11/323839
DATED : November 3, 2009
INVENTOR(S) : Yong Li It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 759 days.

Signed and Sealed this

Twelfth Day of October, 2010

David J. Kappos
*Director of the United States Patent and Trademark Office*